Dec. 6, 1927.
R. RÜDENBERG
1,651,729
DEVICE FOR THE PROTECTION OF COMMUNICATION SYSTEMS
Filed Aug. 26, 1926    2 Sheets-Sheet 1
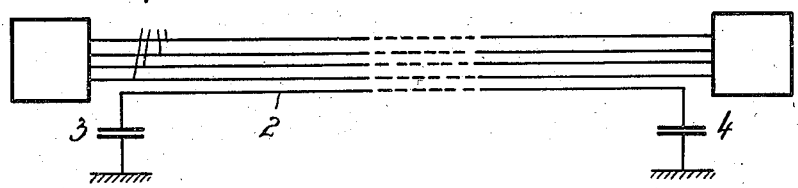
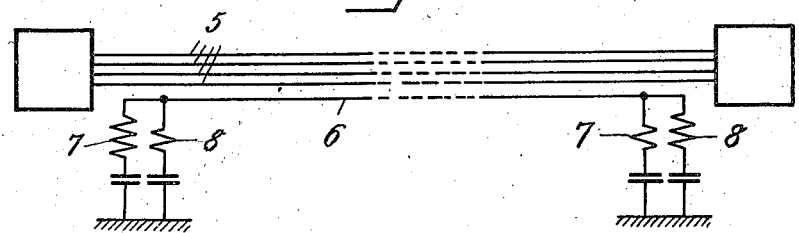
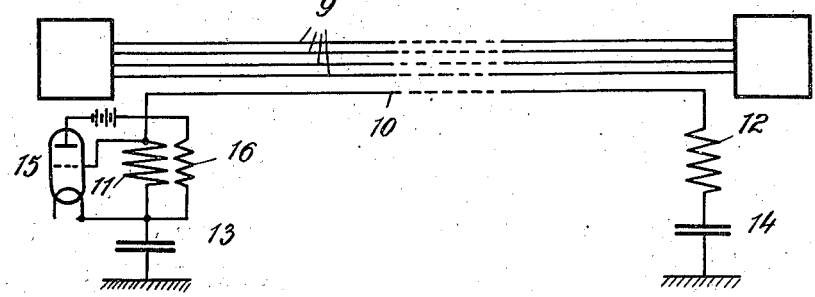
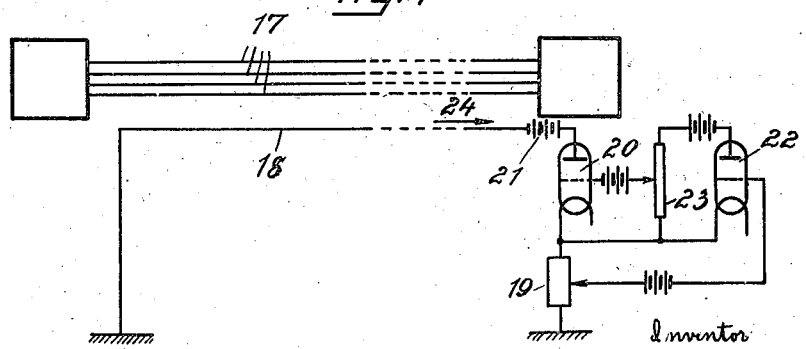
Inventor
Reinhold Rüdenberg
by Knight Bros
attorneys Dec. 6, 1927. 1,651,729
R. RÜDENBERG
DEVICE FOR THE PROTECTION OF COMMUNICATION SYSTEMS
Filed Aug. 26, 1926  2 Sheets-Sheet 2
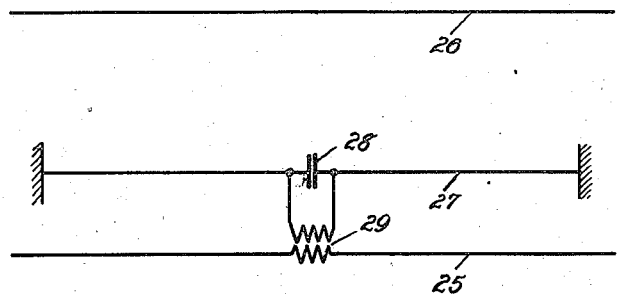
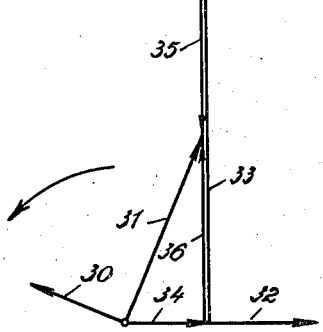
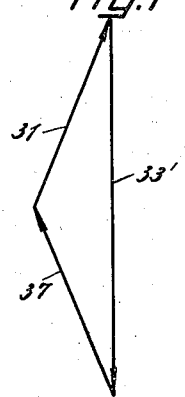
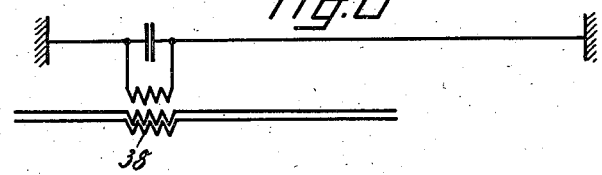
Inventor
Reinhold Rüdenberg
by Knight Bros
Attorneys Patented Dec. 6, 1927.

1,651,729

UNITED STATES PATENT OFFICE.

REINHOLD RÜDENBERG, OF BERLIN-GRUNEWALD, GERMANY, ASSIGNOR TO SIEMENS-SCHUCKERTWERKE GESELLSCHAFT MIT BESCHRANKTER HAFTUNG, OF SIEMENS-STADT, NEAR BERLIN, GERMANY, A CORPORATION OF GERMANY.

DEVICE FOR THE PROTECTION OF COMMUNICATION SYSTEMS.

Application filed August 26, 1926, Serial No. 131,730, and in Germany August 29, 1925.

My invention relates to a device for the protection of communication systems, more particularly telephone and telegraph lines (overhead lines and cables) against the influence of power current systems.

Grounded protective conductors placed adjacent to the overhead line have already been used for this purpose and in the case of cables the cable sheath has been grounded and employed as protective conductor. It has, however, been found that these grounded conductors, even if of large cross-section, do not form a perfect protection of the line.

According to my invention the protective action may be increased if the impedance of the protective conductor is reduced by external means, at least for the disturbing frequencies. If for the inductive resistance of the protective conductor the magnitude of the impedance is primarily decisive, the reduction of the inductive resistance is well worth while for the improvement of the protective action. If the protective line possesses on the other hand substantially ohmic resistance, the reduction of the damping of the protective conductor is the simplest way of attaining the end in view.

Various embodiments of my invention are illustrated in the drawings affixed hereto.

Fig. 1 of the drawing illustrates a communication cable into which an insulated protective conductor is placed.

Fig. 2, a further embodiment of my invention in which the protective conductor is grounded at its ends across two combinations each of capacitance and inductance connected in series relation.

Fig. 3, a further embodiment of my invention in which the inductive resistance and the ohmic resistance of the protective conductor is reduced and the protective action thus increased.

Fig. 4, a further embodiment in which suitable devices bring about the damping reduction for all frequencies approximately uniformly.

Fig. 5, a further embodiment in which one or a plurality of capacitances are inserted in the protective conductor and the voltage at one of the capacitances is transferred to the communication line.

Figs. 6 and 7, show the voltage and current conditions for such a compensation of the disturbing frequency on vector diagrams, and Fig. 8, a further embodiment of my invention as applied to one or a plurality of double comunication lines.

Referring to Fig. 1, 1 are the lines of a communication cable and 2 a protective conductor insulated within the cable. The insulation of the protective conductor assists in the simplification of the electrical conditions and renders impossible disturbances of the protective action due to the influence of the weather. The protective conductor 2 is earthed at its ends across the condensers 3 and 4. The condensers 3 and 4 are so dimensioned that they reduce the directing resistance of the protective conductor for the disturbing frequency.

Referring to Fig. 2, 5 indicates the lines to be protected and 6 the protective line. 7 and 8 are the combinations consisting of inductance and capacitance connected in series relation and which are so dimensioned that the directing resistance of the protective conductor is considerably reduced for two disturbing frequencies each.

Referring to Fig. 3, 9 indicates the conductor to be protected, 10 is the protective conductor, 11 and 12 are two inductances each arranged at one end of the line, 13 and 14 are two capacitances connected in series relation with the inductances 11 and 12 respectively. The protective conductor forms an oscillatory circuit composed of the capacitances 13, 14, the inductances 11 and 12 and the inductance or capacitance of the line 10. By varying the capacitances or inductances the inductive resistance for the disturbing frequencies may be reduced. For reducing the ohmic resistance i. e. for reducing the damping of the circuit the vacuum tube 15 is provided between the grid and the cathode of which the inductance 11 is connected in circuit. Instead of the vacuum tube a series machine or other suitable damping reducing means may be provided. In the anode circuit of the tube is connected the coil 16 which reacts on the inductance 11. The mutual inductance between the two coils is so adjusted that the damping of the oscillatory circuit is small. (Self-excitation must be prevented.)

By means of suitable devices the reduction of the damping may be made to take place approximately uniformly for all frequencies. Such an embodiment of my invention is illustrated in Fig. 4 of the drawings. Referring to this figure 17 are the lines interfered with, 18 is the protective conductor. At the left hand end this conductor is directly grounded and between its right hand end and the ground the resistance 19, the vacuum tube 20 and the battery 21 are connected in circuit. Intermediate the ends of resistance 19 an adjustable tap is provided, which is connected with the grid of the vacuum tube 22. In the anode circuit of this tube is connected the resistance 23, likewise provided with an adjustable tap intermediate its ends, this tap being connected with the grid of the tube 20. If the current in the protective conductor 18 rises, for instance owing to a voltage induced therein in the direction indicated by the arrow 24, the voltage at the resistance 19 increases i. e. the voltage between grid and cathode of the tube 22 drops or becomes negative. In this way the anode current of this tube decreases and at the grid of the tube 20 the negative voltage is reduced. The anode current of this tube will thus rise. The rise of the anode current in the direction of the currents or voltages developed in the protective conductor is equivalent to the reduction in the resistance of the protective conductor. The devices or systems for reducing the damping are preferably placed at the end or intermediate stations of the telegraph or telephone line.

In order to protect the communication lines against a plurality of frequencies the directional frequency for each disturbing frequency may be reduced by the means described. It is, however, also possible to provide a plurality of protective conductors and to equalize them for the various disturbing frequencies, for instance for the fundamental frequency and the third harmonic oscillation (for instance 50 or 150 cycles per second).

The disturbances in communication systems may be particularly well be compensated if one or a plurality of capacitances are connected in the protective conductor and the voltage at one of the capacitances is transmitted to the communication system.

Fig. 5 of the drawings illustrates such an embodiment by way of example. Referring to this figure 25 is the communication line to be protected against the power current line 26. 27 is the protective conductor grounded at two places into which is connected a capacitance 28. In order to destroy as far as possible the disturbing voltage in the communication line itself, a transformer 29 is connected in this line the primary winding of which is connected with the terminals of the condenser. The size of the condenser 28, the ratio of transformation of the transformer 29 and any switch elements provided are so adapted relative to each other that the voltage transmitted from the protective line to the communication line just compensates the voltage induced from the power current line.

The Figures 6 and 7 of the drawings show the voltage and current conditions for such a compensation of the disturbing frequency on vector diagrams. Fig. 6 shows the vector diagram of the currents and voltages in the protective conductor 27. 30 is the vector of the disturbing field generated by the power current line 26 which generates the voltage 31 in the protective conductor 27. This voltage causes the current 32 to flow in the protective conductor. The current 32 causes an inductive voltage drop in the protective conductor which must be covered by the voltage 33 as well as an ohmic voltage drop 34. The inductive voltage drop is opposed by the capacitive voltage drop of the condenser 28 which must be overcome by a voltage which corresponds with the vector 35. The voltage necessary for the maintenance of the current 32 in the protective conductor is thus composed of the vector 34 and the vector 36 and corresponds with the voltage 31 induced by the disturbing field. The vector 36 is the sum of the vectors 33 and 35. In the communication line 25 to be protected the voltage 31 is induced by the disturbing field of the power current line 26 which has the same magnitude as the voltage induced in the protective conductor (Figure 3). To this voltage must be added the voltage $33^1$ induced by the protective conductor which according to the magnetic interlinking between the protective conductor and the disturbed communication line is approximately as great as the inductive voltage drop in the protective conductor. The voltage drop at the condenser 28 is at first not transmitted to the line to be protected. In order to reduce as far as possible in the line 25 the sum of all the voltages induced from the outside, the voltage 37 is also introduced by the aid of the transformer 29 and closes the voltage triangle. This voltage is derived from the voltage drop at the condenser 28 by a corresponding pole connection of the transformer so that its phase is turned by 180°. Its value may easily be adjusted for the necessary amount by the aid of a suitably dimensioned transmission ratio of the transformer. Since the voltage 37 is not displaced accurately by 180° in its phase in relation to the voltage 35 it is necessary for a complete compensation of the disturbing frequency to turn the phase of the voltage (35) derived from the condenser 28 by suitable means as otherwise a small voltage balance would result. The phase displacement of the voltage 37 in relation to the voltage 35 necessary to the complete removal of this voltage balance may be brought about by the connection of an ohmic resistance or a self-induction in the circuit of the transformer.

If the communication line possesses one or a plurality of double lines, a plurality of secondary windings 38 may be provided upon the transformer 29, as illustrated in Figure 8 and these may be connected in the individual communication lines. The secondary winding then contains the branches of the communication lines. The forward and return lines of the individual communication lines must then possess such a direction of winding that the magnetic fields of the current flowing forward and returning in the double line compensate each other.

The voltage of the condenser 28 may not only be transmitted by means of a transformer but also in any other suitable manner, for instance by capacitive coupling.

If only a comparatively short length of the disturbed line is located in proximity to the disturbing line the protective conductor may be laid along the disturbed portion of the line only, for the sake of effecting a saving in material.

Under unfavorable grounding conditions it may sometimes be preferable to employ a bare or insulated wire in the ground instead of the earth return line.

The protection of a protecting wire according to my invention does not only extend to the immediate vicinity of the protective conductor, but is still effective at a distance of a few metres, particularly in the case of overhead lines. The protective conducter may therefore in case of overhead lines, for instance, be placed underneath the overhead line or in the ground itself. A reduction of the inductivity of the protective conductor may be attained in this manner. Generally it is, however, preferable to place the protective conductor into the middle of the disturbed group of lines.

I desire to have it distinctly understood that I do not intend to limit myself to the exact details shown or described, but that I intend to include as part of my invention all such changes and modifications as would suggest themselves to persons skilled in the art and as would fall within the scope of the claims.

I claim as my invention:

1. In a communication plant which is affected by power currents, the combination of at least one line to be protected against disturbances, a protective conductor grounded in at least two places and external means adapted to reduce the impedance of said protective conductor at least for the disturbing frequencies.

2. In a communication plant which is affected by power currents, the combination of at least one line to be protected against disturbances, a plurality of protective conductors grounded in at least two places and external means adapted to reduce the impedance of said protective conductor at least for the disturbing frequencies.

3. In a communication plant which is affected by power currents, the combination of at least one line to be protected against disturbances, at least one protective conductor grounded in at least two places and a condenser connected in the circuit of said protective conductor.

4. In a communication plant which is affected by power currents, the combination of at least one line to be protected against disturbances, at least one protective conductor grounded in at least two places and a plurality of condensers connected in the circuit of said protective conductor.

5. In a communication plant which is affected by power currents, the combination of at least one line to be protected against disturbances, at least one protective conductor grounded in at least two places and an inductance and a capacitance connected in series relation in the circuit of each of said protective conductors.

6. In a communication plant which is affected by power currents, the combination of at least one line to be protected against disturbances, at least one protective conductor grounded in at least two places and a plurality of inductances and a plurality of capacitances connected in series relation in the circuit of each of said protective conductors.

7. In a communication plant which is affected by power currents, the combination of at least one line to be protected against disturbances, at least one protective conductor grounded in at least two places and a plurality of members connected in the circuit of said protective conductor and consisting of a capacitance and self-inductance in series connection, each of which is adapted to reduce the impedance of the protective conductor for one disturbing frequency each.

8. In a communication plant which is affected by power currents, the combination of a plurality of lines to be protected against disturbances and at least one protective conductor grounded in at least two places which is located in the middle of the disturbed group of lines and external means adapted to reduce the impedance of said protective conductor.

9. In a communication plant which is affected by power currents, the combination of a plurality of lines to be protected against disturbances and at least one protective conductor grounded in at least two places which is laid along the disturbed portion only of the line to be protected, and external means adapted to reduce the impedance of said protective conductor.

10. In a communication plant which is affected by power currents, the combination of at least one line to be protected against disturbances, at least one protective conductor grounded in at least two places and means adapted to reduce the loss resistance of said protective conductor.

11. In a communication plant which is affected by power currents, the combination of at least one line to be protected against disturbances, at least one protective conductor grounded in at least two places, an electron tube and means adapted to connect said electron tube with said protective conductor in such a manner that a portion of the losses in the protective conductor is replaced by said electron tube.

12. In a communication plant which is affected by power currents, the combination of at least one line to be protected against disturbances, at least one protective conductor grounded in at least two places, at least one capacitance and at least one self-induction which are connected in series relation in the circuit of the protective conductor, an electron tube, an inductance connected between cathode and anode of said electron tube, a source of current connected in the anode circuit of said tube, conductors for connecting the grid of said electron tube with one end of an inductance connected in the circuit of the protective conductor, conductors for connecting the other end of said inductance with the cathode of said electron tube, and means adapted to couple one of said inductances connected in the circuit of said protective conductor with the inductance connected in the anode circuit of said electron tube.

13. In a communication plant which is affected by power currents, the combination of at least one line to be protected against disturbances, at least one protective conductor grounded in at least two places, an electron tube, a resistance and a battery connected in the circuit of said protective conductor, and means adapted to apply a voltage to the grid of said electron tube dependent of the voltage drop in said resistance.

14. In a communication plant which is affected by power currents, the combination of at least one line to be protected against disturbances, means adapted to strengthen the currents flowing in said lines at the end stations of said line, at least one protective conductor grounded in at least two places, means adapted to reduce the impedance of said protective conductor and means located at the end stations of said lines adapted to reduce the resistance of said protective conductor.

15. In a communication plant which is affected by power currents, the combination of at least one line to be protected against disturbances, intermediate stations in which are located devices for strengthening the currents flowing in said lines, at least one protective conductor grounded in at least two places, means adapted to reduce the impedance of said protective conductor and means located in said intermediate stations adapted to reduce the loss resistance of said protective conductor.

16. In a communication plant which is affected by power currents, the combination of at least one line to be protected against disturbances, a protective conductor grounded in at least two places, at least one capacitance connected in the circuit of said protective conductor, and means adapted to transmit the voltage drop at said capacitance upon the disturbed line.

17. In a communication plant which is affected by power currents, the combination of at least one line to be protected against disturbances, a protective conductor grounded in at least two places, at least one capacitance connected in the circuit of said protective conductor, at least one transformer, the primary winding of which is connected with the terminals of the condenser and the secondary winding of which is connected in the line to be protected.

18. In a communication plant which is affected by power currents, the combination of at least one line to be protected and consisting of two wires serving as forward and return lines, at least one protective conductor grounded in at least two places, at least one capacitance and at least one transformer possessing two secondary windings and one primary winding and the primary winding of which is connected with the terminals of the capacity connected in the circuit of the said protective conductor and the secondary winding of which is connected in two wires each serving as forward and return line in such a manner that the magnetic field of a current flowing in the forward and return line is neutralized in the said transformer.

19. In a communication plant which is affected by power currents, the combination of at least one line to be protected and consisting of two wires serving as forward and return lines, at least one protective conductor grounded in at least two places, at least one capacitance and at least one transformer possessing as many secondary windings as there are lines to be protected against disturbances, conductors for connecting the primary winding of said transformer with a capacitance connected in the circuit of the protective conductor and electric connections for connecting each secondary winding of said transformer with each of the lines to be protected against disturbances in such a manner that the magnetic fields of the current flowing forward and backward in any two lines belonging together neutralize each other in the said transformer.

20. In a communication plant which is affected by power currents, the combination of at least one line to be protected against disturbances, at least one protective conductor grounded in at least two places, at least one capacitance connected in the circuit of each of said protective conductors and at least one transformer, the ratio of transformation of which deviates from one for transmitting the voltage of the capacitance upon the lines to be protected against disturbances.

21. In a communication plant which is affected by power currents, the combination of at least one line to be protected against disturbances, at least one protective conductor grounded in at least two places, at least one transformer for transmitting the voltage of the capacitance connected in the circuit of the protective conductor upon the line to be protected against disturbances and means adapted to change the phase of the voltage transmitted.

22. In a communication plant which is affected by power currents, the combination of at least one line to be protected against disturbances, at least one protective conductor grounded in at least two places, at least one capacitance connected in the circuit of each protective conductor and at least one transformer for transmitting the voltage of the capacitance upon the line to be protected against disturbances, and means adapted to control the magnitude of the voltage transmitted in such a manner that the disturbing voltage induced in the line to be protected is just neutralized.

In testimony whereof I affix my signature.

REINHOLD RÜDENBERG.